3,150,179
PREPARATION OF NORBORNYL UREA BY CHLORINOLYSIS OF NORBORNYL THIOUREA
William R. Diveley, Newark, and Melvin M. Pombo, Wilmington, Del., assignors to Hercules Powder Company, Wilmington, Del., a corporation of Delaware
No Drawing. Filed May 23, 1962, Ser. No. 196,866
8 Claims. (Cl. 260—553)

This invention relates to the preparation of substituted ureas and more particularly to the preparation of substituted ureas from the corresponding thioureas.

In copending application Serial No. 75,917, filed December 15, 1960, by George A. Buntin and William R. Diveley, there is described the preparation of dialkyl norbornyl ureas from norbornene by a series of reactions involving addition of HSCN to norbornene, conversion of the norbornyl isothiocyanate produced to norbornylamine, and conversion of the norbornylamine to the isocyanate which is then reacted with a dialkyl amine to form the dialkyl norbornyl urea. In these reactions the norbornyl radical may be a substituted norbornyl radical.

In accordance with the present invention it has now been found that these, and related urea compounds, represented by the formula

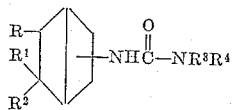

in which R, R$^1$ and R$^2$ when taken as individual radicals are selected from the group of hydrogen, chlorine, bromine, alkyl having up to 4 carbon atoms and chloromethyl and when taken as a group R$^2$ is hydrogen and R and R$^1$ taken together represent a divalent radical of the group —CH$_2$CH$_2$CH$_2$— and $$-CH_2-CHCl-CHCl-$$

and R$^3$ and R$^4$ are selected from the group of alkyl radicals having 1–8 carbon atoms are prepared by a process which comprises preparing a thiourea compound of the formula

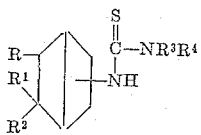

and contacting said thiourea compound in aqueous suspension with chlorine and water until an aqueous acid solution of said urea compound is formed and recovering said urea compound therefrom.

Compounds of this general formula are readily prepared by the following series of reactions

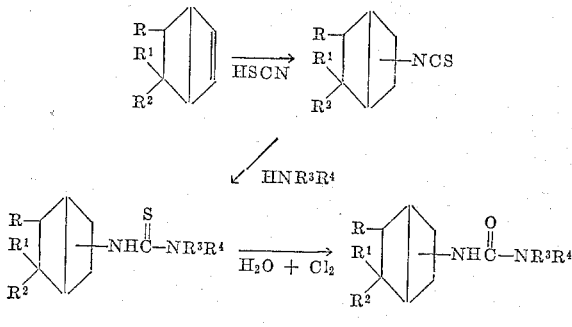

The unsaturated norbornene compounds which are reactive with thiocyanic acid are prepared by reacting cyclopentadiene with substituted ethylenes of the formula

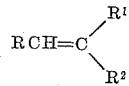

where R, R$^1$ and R$^2$ are as defined above.

The reaction with HSCN is effected by contacting the unsaturated norbornene compound with HSCN generated in situ from a salt of thiocyanic acid and a mineral acid in aqueous media, at ordinary temperatures below 150° C.

The reaction of the resultant isothiocyanate compound with a dialkyl amine, HNR$^3$R$^4$, also takes place on contacting the two reagents at ordinary temperatures below 150° C.

The reaction of the thiourea with chlorine and water takes place in aqueous media at temperatures up to about 100° C. and requires as a minimum one mole of chlorine and one of water per mole of thiourea whereby sulfur and hydrochloric acid are produced as by-products. An excess of chlorine is preferred, and a total of four moles of chlorine will convert the thiourea to the urea with hydrochloric acid and sulfuric acid as by-products. The reaction is carried out in acid medium and may be started in aqueous acid if desired in which case the urea compound produced is taken into solution more readily than when only by-product acid is depended on for acidity.

The process of this invention is more particularly illustrated by the following examples where parts and percentages are by weight.

*Example 1*

*5-chloro-5-methylnorbornene.*—Two hundred parts of 2-chloro-1-propene, 1 part of hydroquinone, and 120 parts of dicyclopentadiene were mixed and sealed in three Carius tubes. The tubes were heated at 200° C. for 15 hours. The tubes were then cooled and opened. The contents weer washed out with benzene and the resulting solution distilled at reduced pressure. A fraction of 80.8 parts of yellow liquid was collected at 80–130° C. at 25 mm. pressure. It analyzed 25.3% Cl compared to a calculated value of 24.9% Cl.

*5 - chloro - 5 - methylnorbornylisothiocyanate.*—To 70 parts of the above 5-chloro-5-methylnorbornene and 75 g. of KSCN in 180 parts of benzene with stirring at 40° C. was added dropwise a solution of 59 parts of concentrated H$_2$SO$_4$ in 17 parts of water. The mixture was stirred for 6 hours at 30–35° C. and then allowed to stand overnight. The mixture was filtered. The cake was washed with benzene. The filtrate and washings were combined and washed with water and dried over Na$_2$SO$_4$. The benzene was distilled off at reduced pressure. The unreacted norbornene was distilled off at 50 to 85° C. at 1 mm. (44 parts) leaving a residue of 25.5 parts of viscous yellow liquid which was taken as isothiocyanate.

*1-(5-chloro-5 - methyl norbornyl) - 3,3 - dimethylthiourea.*—To 25.5 parts of the above isothiocyanate in 60 parts of hexane (filtered to remove a small amount of HSCN polymer) was added dimethylamine gas at 5–15° C. to saturate the solution. The precipitate that formed was filtered out, washed with hexane, and dried. 19.3 g. of soft, tan solid, M.P. 65–67° C. was obtained.

*1-(5-chloro-5-methylnorbornyl)-3,3-dimethylurea.*—To a mixture of 16.8 parts of the above thiourea, suspended in 40 parts of water, was added 14.5 parts of chlorine with stirring over 0.5 hour period. The temperature rose to 38° C. The aqueous layer was filtered and poured into 200 parts of water. After standing for about 3 hours, crystals separated. They were filtered out, washed with water, and recrystallized from benzene-hexane mixture. 5.7 parts of white solid, M.P. 164–165° C. was obtained.

*Example 2*

5-*chloro - 5 - chloromethylnorbornene.*—Two hundred eighty parts of 2,3-dichloropropene-1 and 152 parts of dicyclopentadiene were mixed and sealed in Carius tubes. The tubes were heated at 200° C. for 15 hours. They were opened and the contents removed and distilled at reduced pressure. A fraction of 178.2 parts of water-white liquid was collected at 105–128° C. at 20 mm. pressure.

5-*chloro-5-chloromethylnorbornylisothiocyanate.*—One hundred fifty parts of 5-chloro-5-chloromethylnorbornene prepared as above was reacted with 105 parts KSCN and 85 parts of 98% $H_2SO_4$ in 24 parts of water and 240 parts of benzene. 43.4 parts of viscous yellow liquid product remained after distilling off the unreacted norbornene up to a pot temperature of 80° C. at 0.8 mm. pressure.

1-(5-*chloro-5-chloromethylnorbornyl) - 3,3 - dimethyl-thiourea.*—Thirty-six parts of the isothiocyanate in 40 parts of benzene was saturated with dimethyl amine gas at 10–20° C. The benzene was distilled off at reduced pressure, leaving 38.3 parts of viscous red liquid which cooled to a solid crystalline mass. It analyzed 10.8% S and 22.3% Cl (calculated values are 11.3% S and 25.0% Cl). Thirty parts of this crude thiourea was crystallized from methanol to give 12.8 parts of white crystalline solid, M.P. 138–140° C. It analyzed 24.9% Cl and 9.85% N compared to the calculated values of 25.0% Cl and 9.9% N.

1-(5-*chloro-5-chloromethylnorbornyl) - 3,3- dimethyl-urea.*—Nine and five-tenths parts of the 1-(5-chloro-5-chloromethylnorbornyl)-3,3-dimethylthiourea suspended in 25 parts of water was reacted with 7.2 parts of chlorine. The resulting solution was filtered and neutralized with 20% sodium hydroxide. Six parts of white crystalline solid urea, M.P. 208–210° C. was obtained. It analyzed 26.3% Cl and 10.2% N. The calculated values are 26.7% Cl and 10.5% N for the formula

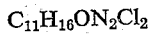

$$C_{11}H_{16}ON_2Cl_2$$

*Example 3*

Vinyl chloride was reacted by heating at 200° C. for 15 hours with cyclopentadiene and the resulting chloronorbornylene was reacted with HSCN and the resulting chloronorbornyl isothiocyanate was reacted with dimethyl amine to produce 1-(chloro-2-norbornyl)-3,3-dimethyl-2-thiourea.

Twenty parts 1-(chloro-2-norbornyl)-3,3-dimethyl - 2-thiourea was suspended in 120 parts of water and chlorine was passed into the water while stirring so as to maintain a sufficiency of chlorine water for the reaction. The reaction mixture was maintained at less than 35° C. by cooling. After about an hour 4 molecular proportions of chlorine had been introduced and a substantially clear solution resulted. This solution was filtered and neutralized with 20% sodium hydroxide to precipitate the product. The product was then recrystallized from a mixture of chloroform and hexane to form 15.7 parts of pure 1-(chloro-2-norbornyl)-3,3-dimethyl-2 - urea which melted at 203–4° C.

In repeat runs the product was isolated from the acid solution by dilution to about 2N acid solution and the urea which crystallized out of the dilute acid was recovered by filtration.

*Example 4*

1-(2-norbornyl)-3,3-dimethyl-2-thiourea was prepared stepwise by reacting norbornene with HSCN and then reacting the product with dimethyl amine, and 19.8 parts was suspended in water at 25–35° C. while 28.4 parts chlorine was passed into the mixture with agitation. The resulting solution was filtered and then neutralized with 20% sodium hydroxide. White crystals of 1-(2-norbornyl)-3,3-dimethyl-2-urea amounting to 14.8 parts separated and after crystallization from aqueous ethanol melted at 176–8° C.

*Example 5*

Cyclopentadiene was reacted with propylene in the Diels-Alder reaction to produce methylnorbornylene, and this was reacted with HSCN as in Example 3, and the resulting 2-)6-methylnorbornyl)isothiocyanate was treated with dimethyl amine as in Example 3. The resulting 1-(methylnorbornyl) - 3,3 - dimethyl thiourea was reacted with chlorine in aqueous suspension as in Example 3 and 1-(methylnorbornyl)-3,3-dimethylurea was obtained.

*Example 6*

Cyclopentadiene was reacted with butene-2 in the Diels-Alder reaction to produce 5,6-dimethylnorbornylene, and this was reacted with HSCN as in Example 3. The resulting 2-(2-methylnorbornyl)isothiocyanate was treated with dimethyl amine as in Example 3. The thiourea produced was then reacted with chlorine in aqueous suspension as in Example 3, and 1-(5,6-dimethylnorbornyl)-3,3-dimethylurea was isolated.

*Example 7*

Cyclopentadiene was reacted with pentene-1 in the Diels-Alder reaction to produce propylnorbornylene, and this was reacted with HSCN as in Example 3. The resulting 2 - (propylnorbornyl)isothiocyanate was treated with dimethyl amine as in Example 3. The resulting thiourea was reacted with chlorine in aqueous suspension as in Example 3 and 1-(propylnorbornyl)-3,3-dimethylurea was obtained.

*Example 8*

Cyclopentadiene was reacted with butene-1 in the Diels-Alder reaction to produce ethylnorbornylene, and this was reacted with HSCN as in Example 3, and the resulting 2-(ethylnorbornyl)isothiocyanate was treated with dimethyl amine as in Example 3. The thiourea produced was reacted with chlorine in aqueous suspension as in Example 3 and 1-(ethylnorbornyl)-3,3-dimethylurea was recovered.

*Example 9*

Cyclopentadiene was reacted with allyl chloride in the Diels-Alder reaction to produce chloromethylnorbornylene, and this was reacted with HSCN as in Example 3. The resulting 2 - (chloromethylnorbornyl)isothiocyanate was treated with dimethyl amine as in Example 3, and the resulting thiourea was converted to 1,1-dimethyl-3-(chloromethylnorbornyl)urea by reaction of the thiourea in aqueous suspension with chlorine gas.

*Example 10*

5,5 - bis(chloromethyl)norbornene was prepared by heating dicyclopentadiene with dichloroisobutylene at 200° C. for 15 hours under autogenic pressure. The product was a yellow liquid, B.P. 80–89° C./0.5 mm. pressure analyzing 35.3% Cl. This 5,5 - bis(chloromethyl norborene was reacted with HSCN prepared in situ as in Example 1 and the resulting 5,5-bis(chloromethyl)norbornyl isothiocyanate was reacted with dimethyl amine to produce 1-(5,5-bis(chloromethyl))-3,3-dimethyl thiourea which was treated with chlorine and water as in Example 2. From the reaction mixture the 1 - (5,5 - bis(chloromethyl)norbornyl)-3,3-dimethylurea, M.P. 145–8° C. was obtained.

*Example 11*

Following the procedure of Example 1, 1-norbornyl-3,3-dimethylthiourea was prepared by reacting norbornene with HSCN to produce the isothiocyanate and then reacting this with dimethyl amine.

The 1-norbornyl-3,3-dimethylthiourea was pulverized and 17.3 parts were suspended in 50 parts water and 28.5 parts chlorine and 150 parts water were added while stirring vigorously until a homogeneous solution was obtained. The temperature rose during this treatment from about 25° C. to about 60° C. The resulting solution was diluted with 800 parts cold water to reduce the acid concentration to about 2 N and the 1-norbornyl-3,3-dimethylurea, M.P. 176–9° C., crystallized out.

*Example 12*

Tetrahydrodicyclopentadienyl dimethylthiourea was prepared by the following steps: (1) addition of HSCN to one double bond of dicyclopentadiene; (2) hydrolysis of the isothiocyanate under (1) to the amine; (3) hydrogenation of the double bond in the ring of the amine; (4) reaction of the hydrogenated amine with $CS_2$ and alkali and then with ethyl chloroformate to produce tetrahydrodicyclopentadienyl isothiocyanate; (5) reaction of the isothiocyanate produced under step (4) with dimethyl amine to form tetrahydrodicyclopentadienyl dimethylthiourea.

The above thiourea was pulverized and 23.7 parts were suspended in 100 parts water. To this suspension was added with stirring at about 25° C. chlorine gas until 28.5 parts chlorine was added. The temperature rose to about 60° C. during this process and the solids all dissolved. The resulting clear solution was diluted with 800 parts of cold water and allowed to crystallize. There was thus obtained 1-(tetrahydrodicyclopentadienyl)-3,3-dimethylurea, M.P. 164–5° C.

While the process of this invention is applicable to the conversion of the substituted organic thioureas regardless of their source to the corresponding ureas it is particularly applicable as a preparative method where the thiourea is prepared by way of the addition of thiocyanic acid to an unsaturated compound whereby substituted organic ureas of the general formula

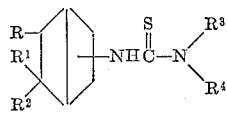

are produced.

The process of this invention is carried out at any temperature in the range from the freezing point of the acid water to about 100° C. Temperatures well below 0° C. are thus operable. The preferred reaction temperature is in the range of about 15° C. to about 40° C.

In the process of this invention, the acid water of the system when above about 2 N dissolves the urea produced. While the reaction may be started in neutral water, the water becomes acid upon addition of the chlorine. The urea formed does not dissolve until the normality of the acid water rises above 2 N, however, and to attain this strength the initial water may be acid water. Alternatively, only part of the water may be used initially so as to attain the desired acid concentration rapidly, and water may be added during the course of addition of the chlorine to facilitate maintenance of a suitable reaction slurry. Moreover, the thiourea may likewise be added to the aqueous reaction mixture simultaneously with the addition of the chlorine, the main objective being the maintenance of an acid concentration above about 2 N and preferably in the range of 2–8 N during the process so as to dissolve the urea formed.

A particularly suitable procedure in starting with acid water is to add the thiourea to approximately 2 N hydrochloric acid or a mixture of hydrochloric and sulfuric acid of about 2 N such as is obtained in the process of this invention in the step of recovering the urea by dilution with water from the more concentrated acid to 2 N acid. The mixture of thiourea in the hydrochloric acid is then contacted with chlorine gas at 15–40° C. until the thiourea has substantially all reacted and the resulting urea is in solution. The resulting solution is then diluted with water until the substituted urea product crystallizes out. The slurry is cooled to about 0° C. to facilitate crystallization of the substituted urea product which is separated by filtration, and the acid water is recycled in part and the part not recycled is treated with sodium carbonate or sodium hydroxide to lower the normality to less than 2, preferably less than 1, and the residual substituted urea is recovered.

When it is not desired to recirculate the recovered acid water, the urea may be all recovered by lowering the normality of the acid by neutralization or partial neutralization to a normality of less than 1 whereby the substituted urea crystallizes out and is recovered. The neutralization or partial neutralization is preferably effected with sodium hydroxide or carbonate. The neutralization is carried out at ambient temperature with cooling if necessary to keep the temperature in the range of 0–60° C.

What we claim and desire to protect by Letters Patent is:

1. The method of preparing a urea compound of the formula

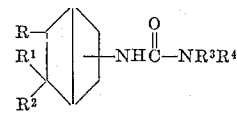

in which R, $R^1$, and $R^2$, when taken as individual radicals, are selected from the group consisting of hydrogen, chlorine, bromine, alkyl radicals having 1 to 4 carbon atoms and chloromethyl, and when taken as a group, $R^2$ is hydrogen, and R and $R^1$ taken together represent a divalent radical of the group consisting of —$CH_2CH_2CH_2$— and —$CH_2CHCl$—$CHCl$—, and $R^3$ and $R^4$ are selected from the group consisting of alkyl radicals having 1 to 8 carbon atoms, which comprises contacting a thiourea compound of the formula

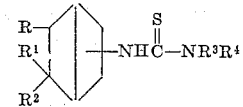

in aqueous suspension with chlorine and water until an aqueous acid solution of said urea compound is formed and recovering said urea compound therefrom.

2. The method of claim 1 in which the urea compound is recovered from the acid solution thereof by diluting the acid solution with water to 2 N acidity.

3. The method of claim 1 in which the compounds are those in which R and $R^1$ are hydrogen, $R^2$ is chlorine, and $R^3$ and $R^4$ are methyl radicals.

4. The method of claim 1 in which the compounds are those in which R is hydrogen, and $R^1$, $R^2$, $R^3$ and $R^4$ are methyl radicals.

5. The method of claim 1 in which the compounds are those in which $R^2$ is hydrogen, R and $R^1$ taken together represent —$CH_2CH_2CH_2$—, and $R^3$ and $R^4$ are methyl radicals.

6. The method of claim 1 in which the compounds are those in which R is chlorine, $R^1$ is hydrogen and $R^2$, $R^3$ and $R^4$ are methyl radicals.

7. The method of claim 1 in which the compounds are those in which R is chlorine, $R^1$ is hydrogen, $R^2$ is chloromethyl, and $R^3$ and $R^4$ are methyl radicals.

8. The method of claim 1 in which the compounds are those in which R, $R^1$ and $R^2$ are hydrogen, and $R^3$ and $R^4$ are methyl radicals.

References Cited in the file of this patent

UNITED STATES PATENTS 3,074,850    Hasspacker  ------------ Jan. 22, 1963

FOREIGN PATENTS 804,300    Great Britain ---------- Nov. 12, 1958

OTHER REFERENCES

Capps et al.: J. Amer. Chem. Soc., vol. 54 (1932), pages 4301–5.

Jones: Inorganic Chemistry (1947), pages 163, 165, 526–7 and 533.

UNITED STATES PATENT OFFICE
CERTIFICATE OF CORRECTION

Patent No. 3,150,179                        September 22, 1964

William R. Diveley et al.

It is hereby certified that error appears in the above numbered patent requiring correction and that the said Letters Patent should read as corrected below.

Column 1, lines 26 to 31, and lines 45 to 50, each occurrence, and lines 59 to 63, both occurrences, and lines 65 to 72, both occurrences, column 5, lines 42 to 45, column 6, lines 31 to 35 and 48 to 53, each occurrence, in the center of each benzene ring of the structural formulae, insert a dot, representing a carbon atom; column 4, line 12, for "2-)6-" read -- 2-(6- --; line 21, strike out "result-"; same column 4, line 22, for "2-(2-methylnorbornyl)isothiocyanate" read -- 2-(5,6-dimethylnorbornyl)isothiocyanate --.

Signed and sealed this 19th day of January 1965.

(SEAL)
Attest:

ERNEST W. SWIDER                      EDWARD J. BRENNER
Attesting Officer                   Commissioner of Patents